US008286605B2

(12) United States Patent
Watanuki et al.

(10) Patent No.: US 8,286,605 B2
(45) Date of Patent: Oct. 16, 2012

(54) EXHAUST GAS RECIRCULATION VALVE

(75) Inventors: Haruo Watanuki, Tokyo (JP); Satoru Hasegawa, Tokyo (JP); Takuro Zui, Tokyo (JP); Sotsuo Miyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 12/312,917

(22) PCT Filed: Oct. 1, 2007

(86) PCT No.: PCT/JP2007/069201

§ 371 (c)(1),
(2), (4) Date: Jun. 1, 2009

(87) PCT Pub. No.: WO2008/081628

PCT Pub. Date: Jul. 10, 2008

(65) Prior Publication Data

US 2010/0065026 A1 Mar. 18, 2010

(30) Foreign Application Priority Data

Dec. 28, 2006 (JP) ................................ 2006-355892

(51) Int. Cl.

| | |
|---|---|
| ***F01L 3/00*** | (2006.01) |
| ***F02B 47/08*** | (2006.01) |
| ***F02M 25/07*** | (2006.01) |
| ***F16K 1/00*** | (2006.01) |
| ***F16K 15/00*** | (2006.01) |

(52) U.S. Cl. ................. 123/188.9; 123/568.21; 251/318

(58) Field of Classification Search ............. 123/568.11, 123/568.2, 568.26, 188.6, 188.9, 568.16, 123/568.21; 251/129.15, 214, 318; 137/544
See application file for complete search history.

(56) References Cited

U.S. PATENT DOCUMENTS

| | | | | |
|---|---|---|---|---|
| 5,467,962 | A * | 11/1995 | Bircann et al. | 251/129.15 |
| 5,666,932 | A * | 9/1997 | Bauerle et al. | 123/568.21 |
| 6,330,880 | B1 * | 12/2001 | Okada et al. | 123/568.2 |
| 6,481,424 | B2 * | 11/2002 | Bircann et al. | 123/568.11 |
| 2004/0107949 | A1 | 6/2004 | Miyoshi et al. | |
| 2005/0082507 | A1 * | 4/2005 | Tanaka et al. | 251/318 |
| 2005/0199847 | A1 * | 9/2005 | Hatano et al. | 251/129.15 |

FOREIGN PATENT DOCUMENTS

| | | | |
|---|---|---|---|
| JP | 59-52110 | U | 4/1984 |
| JP | 8-319903 | A | 12/1996 |
| JP | 2001-271714 | A | 10/2001 |
| JP | 2002-285918 | A | 10/2002 |
| JP | 2003-65456 | A | 3/2003 |
| WO | WO-03/060314 | A1 | 7/2003 |

* cited by examiner

*Primary Examiner* — Stephen K Cronin
*Assistant Examiner* — Sherman Manley
(74) *Attorney, Agent, or Firm* — Birch, Stewart, Kolasch & Birch, LLP

(57) ABSTRACT

In an EGR valve provided in an exhaust gas recirculation passage for recirculating the exhaust gas of an engine, a filter 26*b* is provided on the side of an exhaust gas passage 22 of a bearing 26*a* supporting a valve rod 25, while a diameter-reduced section 25*a* is provided in an area on the valve rod 25 in proximity to the filter 26*b*.

3 Claims, 3 Drawing Sheets

EXHAUST GAS RECIRCULATION VALVE

TECHNICAL FIELD

The present invention relates to an exhaust gas recirculation valve provided in a recirculation passage of the exhaust gas of an engine.

BACKGROUND ART

In an engine of an automobile vehicle, in order to reduce the $NO_x$ contained in the exhaust gas thereof, is provided an exhaust gas recirculation apparatus recirculating the exhaust gas to the intake side thereof. An exhaust gas recirculation passage of the apparatus is provided with an EGR valve ("Exhaust Gas Recirculation" valve), and the EGR valve is controlled based on the driving information or the like of the engine. If high-temperature exhaust gas is recirculated to the intake side thereof as it is, the efficiency of the engine becomes deteriorated, and thus, in general, the exhaust gas recirculation passage is provided with an EGR cooler for cooling the high-temperature exhaust gas.

Exhaust gas passing through the EGR valve contains sulfur oxides coming from a fuel system, and nitrogen oxides and particulate matter (PM) such as soot and the like which are produced by combustion. Therefore, those substances are also introduced in the exhaust gas recirculation passage, and they adhere to a valve rod of the EGR valve. When the soot and the like are deposited over the valve rod (the matter deposited thereover is referred to as "deposit"), they can cause trouble in normalfunction of the valve rod. In order to solve the troubles caused by the adhesion of the particulate matter to the valve rod, a technology is disclosed (Patent Document 1), arranged to prevent the soot and the like from being caught by the inner surface of a bearing, by providing a deposit relief groove formed by reducing the diameter of the valve rod on the valve rod side in the portion of the valve rod sliding in the bearing such that the soot and the like are collected in the deposit relief groove.

Patent Document 1: JP-A-2002-285918

The technology disclosed in Patent Document 1 aims to deposit the soot and the like within the deposit relief groove; however, the particulate matter does not necessarily uniformly adhere to the surface of the deposit relief groove. When the matter is heavily deposited at one site in the groove or the groove is filled up with the deposit, the deposit causes trouble in normal operation of the valve. Further, when the soot and the like are deposited over the shouldered portion between the bottom of the reduced-diameter section forming the deposit relief groove and the outer surface of the valve rod, and the deposit becomes massive, it can prevent the valve rod from operating.

Otherwise, a proposal is made to provide a filter through which a valve rod extends on the exhaust gas passage side of a bearing and actively scrape the soot and the like adhered to the valve rod using the filter. However, when the deposition of the scraped soot, etc. continues over a valve head provided at the end of the valve rod and the deposit increases in volume to exceed the external diameter of the valve rod, the deposit becomes a cause of the malfunction of the valve rod.

The present invention has been accomplished to solve such a technical situation, and an object of the present invention is to prevent the malfunction of an EGR valve exposed to exhaust gas even if soot and the like adhere to the valve rod of the EGR valve.

DISCLOSURE OF THE INVENTION

The present invention is characterized in that in an EGR valve provided in an exhaust gas recirculation passage for recirculating the exhaust gas of an engine, a filter is provided on the side of an exhaust gas passage of a bearing supporting a valve rod, while a diameter-reduced section is provided in the portion of the valve rod in proximity to the filter.

According to the EGR valve of the present invention, the soot and the like scraped with the filter does not remain over the valve rod to fall downward therefrom by virtue of the diameter-reduced section being provided therebelow. Even when the soot and the like is deposited over a valve head, the diameter-reduced section provided on the valve rod prevents the diameter of the rod from increasing largely, thereby not causing the malfunction of the valve rod.

BEST MODE FOR CARRYING OUT THE INVENTION

Embodiments of the present invention will now be described with reference to the accompanying drawings in order to explain the present invention in more detail.

First Embodiment

Figure 1:
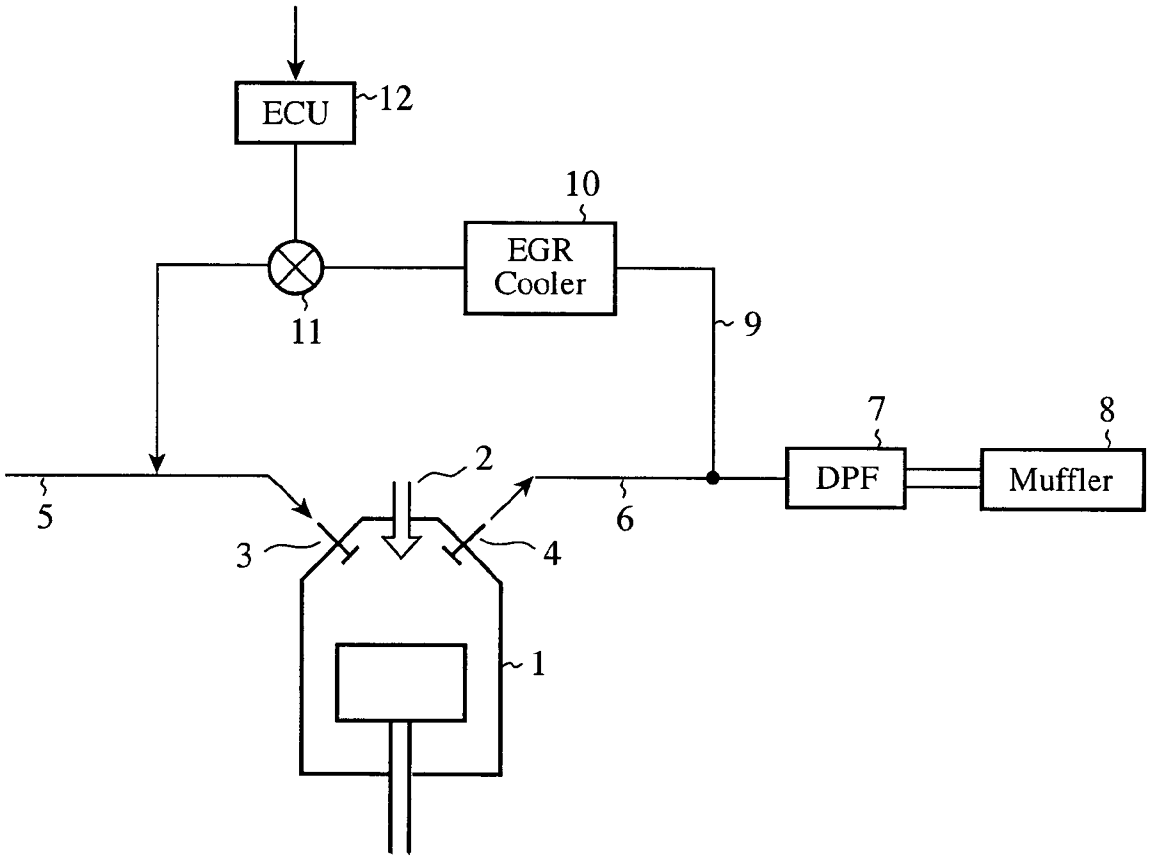
FIG. 1 is a schematic view of an engine equipped with an EGR valve to which the present invention is applied.
Figure 2:
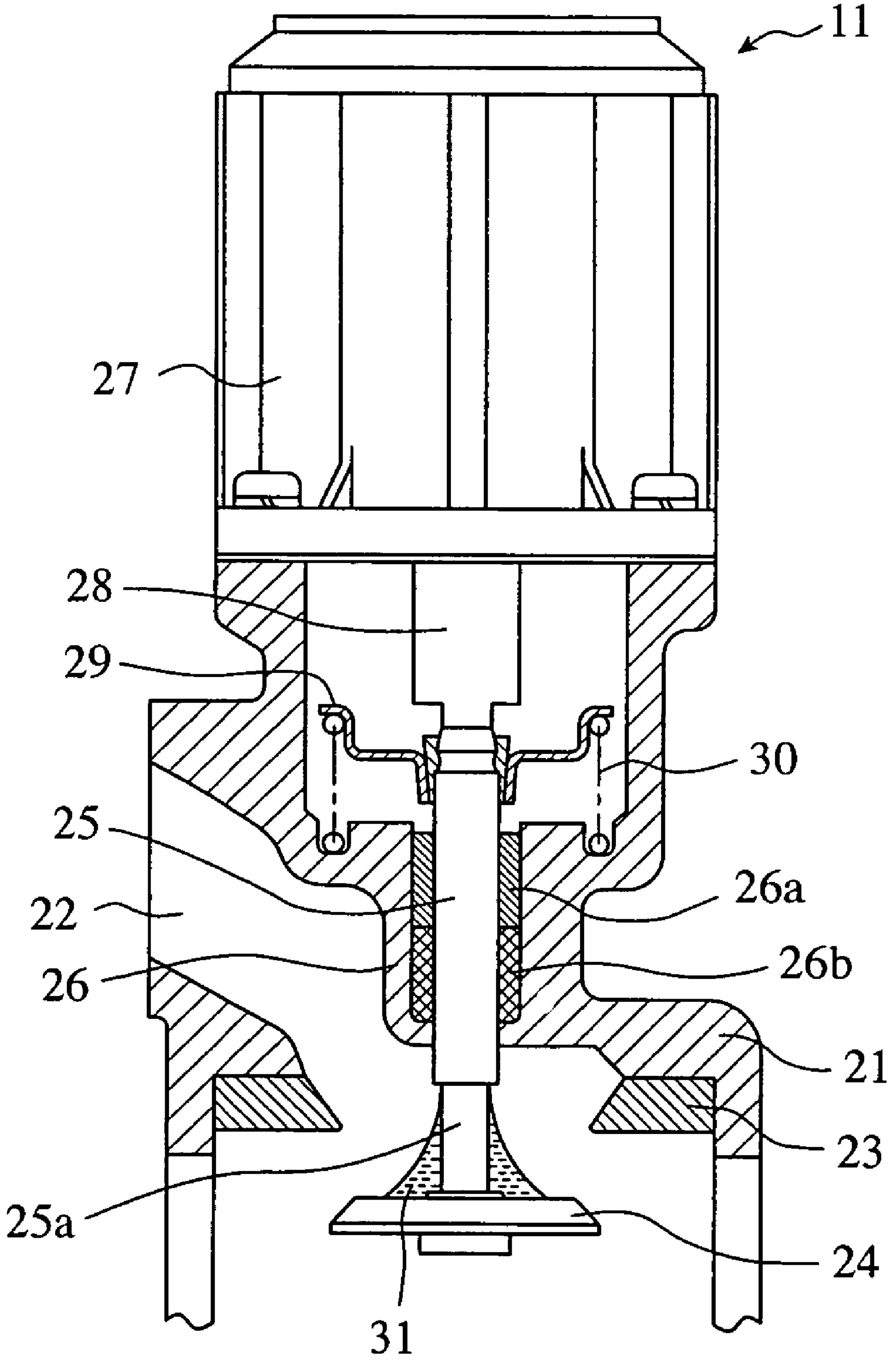
FIG. 2 is a sectional view of an EGR valve according to the first embodiment of the present invention.

FIG. 1 is a schematic view of an engine equipped with an EGR valve and an EGR cooler, and FIG. 2 is a sectional view of an EGR valve according to the first embodiment of the present invention.

First, the outline of an engine with which the present invention is concerned will be discussed. A diesel engine 1 has a fuel injection nozzle 2 inserted in its combustion chamber to a shallow depth, and the chamber is provided with an inlet valve 3 taking in air to the combustion chamber and an exhaust valve 4 exhausting combustion gas in the combustion chamber therefrom. The inlet valve 3 has an intake passage 5 connected thereto and the exhaust valve 4 has an exhaust passage 6 connected therewith. The exhaust passage 6 is provided with a DPF filter 7 for removing particulate matter (PM) contained in an exhaust gas and further is provided with a muffler 8. The exhaust passage is provided with an exhaust gas recirculation passage 9 that is branched from the exhaust passage 6 and connected with the intake side thereof, and the exhaust gas recirculation passage 9 is provided with an EGR cooler 10 and an EGR valve 11. The EGR cooler 10 has a structure for cooling the exhaust gas by a water cooling system. The EGR valve 11 is controlled by an electronic control unit (ECU) 12. The EGR valve 11 controls the exhaust gas cooled by the EGR cooler 10 based on a variety of information such that the exhaust gas is supplied in an optimum amount to the intake side thereof.

As shown in FIG. 2, in the EGR valve 11, a valve housing 21 constituting a main body thereof is provided with an exhaust gas passage 22 for introducing the exhaust gas cooled by the EGR cooler 10 to the intake side; the exhaust gas passage 22 is provided with a valve seat 23 formed at the halfway position of the passage; and the exhaust gas passage is further provided with a valve head (valve disk) 24 opening and closing the exhaust gas passage 22 by engaging and disengaging the valve seat 23. The valve head 24 is provided on the tip of a valve rod (valve shaft) 25 by press-fitting the valve rod thereinto or an equivalent method. The valve rod 25 is axially slidably supported by a bearing section 26 assembled in the valve housing 21. In this connection, the bearing section 26 consists of a mechanical bearing 26*a* such as a bushing or the like and a filter 26*b* formed of thin wire like a sponge. The filter 26*b* prevents foreign matter or the like from intruding the bearing 26*a*.

The rear end of the valve rod 25 is opposed to the top of a rod 28 of an actuator 27 provided on the valve housing 21. The actuator 27 is driven and controlled by commands from the electronic control unit (see FIG. 1). The valve rod 25 has a spring holder 29 attached on the upper portion thereof, and provided between the spring holder 29 and the valve housing 21 is a spring 30 exerting a spring force on the valve rod 25 for causing the valve head 24 to engage the valve seat 23. The actuator 27 is operated by the electronic control unit to thereby cause the rod 28 to axially press the valve rod 25, and thereby, the valve head 24 is separated from the valve seat 23, thus opening the valve. The rod 28 of the actuator 27 returns by a restoring force of the spring 30, thus engaging the valve head 24 to the valve seat 23.

A diameter-reduced section (reduced section) 25*a* is formed in the area extending from the location on the rod, moving to directly below the filter 26*b* when the valve is closed, in other words, when the valve head 24 is seated on the valve seat 23, to a press-fitted section 24*a* of the valve head 24. Note that the surface of the valve rod 25 is normally given chromium plating or the like.

In the EGR valve 11 having such a valve rod 25, the particulate matter adhered to the surface of the valve rod 25 upon opening of the valve is scraped by the filter 26*b* when the valve is closed. The scraped particulate matter does not stay adhering to the valve rod 25, but falls down therefrom by virtue of the diameter-reduced section 25*a* being provided right under the scraped one. Thus, the particulate matter remains deposited on the portion of the valve rod 25 right under the filter 26*b*, and the matter deposited thereon increases in diameter and further axially upwardly increases. Thus, the deposited matter does not cause trouble in operation of the valve rod 25.

Figure 3:
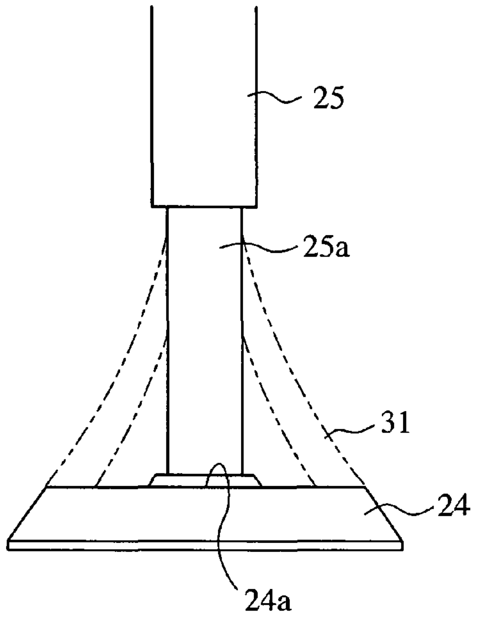
FIG. 3 is an enlarged view of a part of the EGR valve shown in FIG. 2.

As shown in FIG. 3, even if the particulate matter 31 continues depositing over the topside of the valve head 24, the matter does not increase in size exceeding the external diameter of the valve rod 25 because the diameter-reduced section 25*a* is provided thereon, and does not cause the malfunction of the valve rod 25.

Figure 4:
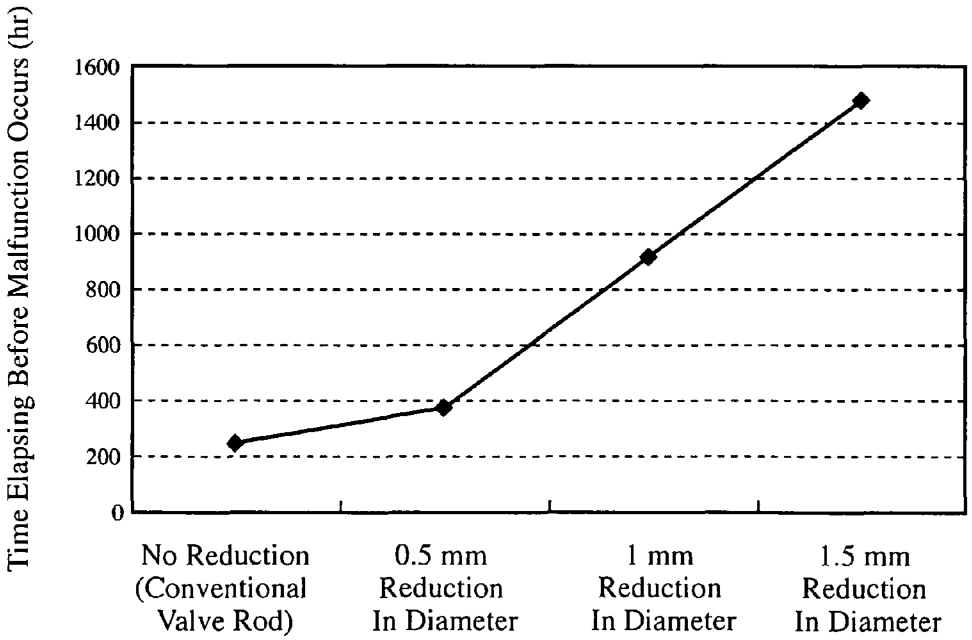
FIG. 4 is a graph of experimental results on which the effect of providing a diameter-reduced section with a valve rod is verified.

FIG. 4 shows results verified by experiments with respect to the effects where the valve rod 25 is provided with the diameter-reduced section 25*a*. This represents the results in the case where accelerated tests were carried out with the external diameter of the diameter-reduced section 25*a* as a parameter, and then elapsed times up to occurrences of the malfunction were measured. In the graph of FIG. 4, the abscissa represents the amount of reduction in the diameter of the diameter-reduced section 25*a* of the valve rod 25 (the amounts of reduction: 0 mm, 0.5 mm, 1.0 mm, and 1.5 mm), while the ordinate represents the time (hour) elapsing before the malfunction occurs. From the figure, the 1.0 mm reduction in the diameter of the valve rod 25 is found to be effective in preventing the malfunction.

According to the first embodiment, the diameter-reduced section 25*a* is provided in the area of the valve rod extending from the location immediately under the filter 26*b* upon closing of the valve to the valve head 24, and thus the particulate matter 31 adhered to the valve rod 25 and then scraped with the filter 26*b* can fall down therefrom. For this reason, the particulate matter 31 cannot remain over the surface of the valve rod 25, which does not increase the diameter of the valve rod 25. Thus, the valve rod 25 does not cause any malfunction. Further, since the diameter-reduced section 25*a* is provided thereon, even when the particulate matter 31 is deposited over the valve head 24, the deposited particulate matter 31 is prevented from growing beyond the original diameter of the valve rod 25, which restrains the valve rod 25 from causing the malfunction.

According to the first embodiment, the diameter-reduced section 25*a* is provided therein in the area extending from the location immediately below the filter 26*b* upon closing of the valve to the press-fitted section of the valve head 24; however, even when the diameter-reduced section is provided not extending to the press-fitted section of the valve head 24, but to a location short of the press-fitted section thereof, the effect similar to that of the present invention can be attained.

INDUSTRIAL APPLICABILITY

As mentioned above, the exhaust gas recirculation valve according to the present invention is an exhaust gas recirculation valve arranged such that a valve rod does not cause any malfunction even when soot and the like adhere to the valve rod by providing a filter on the exhaust gas passage side of a bearing supporting the valve rod of an EGR valve and further providing a diameter-reduced section in an area on the valve rod close to the filter, and thus the exhaust gas recirculation valve is suitable, e.g., for an exhaust gas recirculation valve provided in a recirculation passage of the exhaust gas of an engine.

The invention claimed is:

1. An exhaust gas recirculation valve provided in an exhaust gas recirculation passage for recirculating the exhaust gas of an engine, comprising:

a filter provided on the exhaust gas passage side of a bearing supporting a valve rod, wherein a diameter-reduced section of the valve rod having a constant diameter is provided adjacent to the filter of the valve rod and extends in length to a press fitted section of a valve head to which the valve rod is fitted, when the valve is closed, said diameter reduced section of the valve rod being moved adjacent to said filter when the valve is closed to prevent particulate matter scraped by said filter from depositing on the valve rod by dropping said particulate matter through said diameter-reduced section.

2. The exhaust gas recirculation valve according to claim 1, wherein the diameter-reduced section is formed extending to a valve head provided at the end of the valve rod.

3. The exhaust gas recirculation valve according to claim 1, wherein a diameter of the diameter-reduced section is reduced 1 mm or more from the valve rod diameter.

* * * * *